US012100343B2

(12) United States Patent
Park et al.

(10) Patent No.: US 12,100,343 B2
(45) Date of Patent: Sep. 24, 2024

(54) DISPLAY DEVICE WITH HIGH RESOLUTION OF DISPLAY IMAGE AND LOW CURRENT CONSUMPTION

(71) Applicant: TLI Inc., Seongnam-si (KR)

(72) Inventors: Ju Hyun Park, Suwon-si (KR); Hwi Jeong Jo, Seoul (KR)

(73) Assignee: TLI INC., Seongnam-si (KR)

( * ) Notice: Subject to any disclaimer, the term of this patent is extended or adjusted under 35 U.S.C. 154(b) by 0 days.

(21) Appl. No.: 18/514,578

(22) Filed: Nov. 20, 2023

(65) Prior Publication Data

US 2024/0257725 A1 Aug. 1, 2024

(30) Foreign Application Priority Data

Jan. 27, 2023 (KR) ........................ 10-2023-0010586

(51) Int. Cl.
*G09G 3/32* (2016.01)

(52) U.S. Cl.
CPC ........... *G09G 3/32* (2013.01); *G09G 2310/08* (2013.01); *G09G 2330/021* (2013.01)

(58) Field of Classification Search
USPC ........................................................ 345/691
See application file for complete search history.

(56) References Cited

U.S. PATENT DOCUMENTS 8,941,558 B2 1/2015 Park et al.
2001/0019319 A1* 9/2001 Kim .................... G09G 3/3233 345/77
2008/0180293 A1* 7/2008 Kitahira ................ H03M 3/358 341/144
2009/0102866 A1* 4/2009 Lim ..................... H05B 45/325 345/690
2010/0085289 A1* 4/2010 Munteanu ............ G09G 3/3406 345/88
2013/0076724 A1* 3/2013 Park ..................... H04N 13/366 345/212
2016/0275845 A1* 9/2016 Tsai ..................... G09G 3/2003
2018/0075801 A1* 3/2018 Le ........................ G09G 3/3233
(Continued)

FOREIGN PATENT DOCUMENTS

EP 4 120 231 1/2023
KR 10-0850498 8/2008
KR 10-2199942 1/2021

*Primary Examiner* — Chineyere D Wills-Burns
(74) *Attorney, Agent, or Firm* — KILE PARK REED & HOUTTEMAN PLLC

(57) ABSTRACT

Disclosed herein is to a display device with high resolution of display image and low current consumption. In the display device of the disclosure, the activation width of a modulation signal that causes a current to flow in a light emitting element of a display panel, reflects an activation width of a micro response signal that can be divided into a short unit time. Accordingly, the light emitting element that emits light with a brightness corresponding to the activation width of the modulation signal, can implement a high-resolution display image. The micro modulation part that includes a high frequency clock generating unit and a micro modulation unit, is disabled in a subframe in which the micro response signal is inactivated. Therefore, according to the display device of the disclosure, current consumption can be reduced with maintaining a high resolution of a display image.

20 Claims, 9 Drawing Sheets

(56) References Cited

U.S. PATENT DOCUMENTS

| | | | | |
|---|---|---|---|---|
| 2022/0007478 | A1* | 1/2022 | Chan | G09G 3/32 |
| 2022/0085127 | A1* | 3/2022 | Xuan | G09G 3/3266 |
| 2022/0116622 | A1* | 4/2022 | Possos | H04N 19/137 |
| 2022/0415245 | A1* | 12/2022 | Lee | G09G 3/32 |
| 2023/0298510 | A1* | 9/2023 | Choi | G09G 3/32<br>345/82 |
| 2024/0071288 | A1* | 2/2024 | Liao | G09G 3/3233 |

* cited by examiner

DISPLAY DEVICE WITH HIGH RESOLUTION OF DISPLAY IMAGE AND LOW CURRENT CONSUMPTION

CROSS-REFERENCE TO RELATED APPLICATION

This application claims priority to and the benefit of Korean Patent Application No. 10-2023-0010586 under 35 U.S.C. § 119, filed on Jan. 27, 2023 in the Korean Intellectual Property Office (KIPO), the disclosure of which is incorporated herein by reference in its entirety.

BACKGROUND

1. Technical Field

The disclosure relates to a display device, and more particularly, to a display device which is capable of reducing current consumption with maintaining high resolution of a display image.

2. Discussion of Related Art

Display devices such as LED displays include light emitting elements such as LEDs. The light emitting element emits light with a brightness according to the data value of the corresponding frame data. The brightness corresponds to a luminous energy, which is the energy of light, and is a function of luminous intensity and luminous time.

As a brightness control method of a display device, a so-called "pulse width modulation (PWM) driving method" is widely used. According to the PWM driving method, the data value of the frame data of the light emitting element is modulated as the sum of the activation widths of the modulation signal. The light emitting element emits light while maintaining a constant luminous intensity during the activation of the modulation signal.

In the PWM driving method, a unit frame is divided into subframes. Each of the subframes includes unit times. In order to implement a high resolution of a display image, it is necessary to shorten the width of the unit time.

However, in case that the display device is continuously operated with a short unit time, the current consumption is increased. Accordingly, the display device capable of reducing current consumption while maintaining high resolution of a display image is desired.

SUMMARY

The disclosure is directed to a display device capable of reducing current consumption with maintaining high resolution of a display image.

The technical objectives to be achieved by the disclosure are not limited to those described herein, and other technical objectives that are not mentioned herein would be clearly understood by a person skilled in the art from the description of the disclosure.

According to an aspect of the disclosure, there is provided a display device.

The display device according to the disclosure may comprise a display panel including a light emitting element, wherein the light emitting element emits light with a brightness according to a total amount of current flowing in the light emitting element during a unit frame; a data driver that allows current to flow through the light emitting element of the display panel for a time corresponding to an activation width of a modulation signal; and a pulse width modulator that generates the modulation signal with modulating frame data of the light emitting element of the display panel during the unit frame, wherein the activation width of the modulation signal corresponds to the data value of the frame data, and the frame data includes a sum of macro data and micro data, and the data value of the micro data is less than or equal to a macro unit data value of the macro data, wherein the unit frame includes 1-st to n-th subframes which are sequentially progressed, and each of the 1-st to n-th subframes is 'p' number of macro unit times, and the macro unit time corresponds to each of the macro unit data value of the macro data and the sum of 'q' number of micro unit times, and the micro unit time corresponds to a micro unit data value of the micro data, wherein 'n' is a natural number greater than or equal to '2', and 'p' is a natural number greater than or equal to '2', and 'q' is a natural number greater than or equal to '2'. The pulse width modulator includes: a macro modulation part that receives the macro data and generates a macro response signal, wherein an activation width of the macro response signal corresponds to the data value of the macro data and is equal to the macro unit time multiplied by an integer equal to or greater than 'O'; a micro modulation part that receives the micro data and generates a micro response signal, wherein an activation width of the micro response signal corresponds to the data value of the micro data and is equal to the micro unit time multiplied by an integer equal to or greater than '0'; an activation summing part that receives the macro response signal and the micro response signal to generate the modulation signal, wherein the activation width of the modulation signal corresponds to the sum of the activation width of the macro response signal and the activation width of the micro response signal; and a micro disable generating part that generates a micro disable signal activated according to the data value of the micro data, wherein the micro disable signal is activated in any of the 1-st to n-th subframe in which the micro response signal is not activated. The micro modulation part is disabled according to the activation of the micro disable signal.

In an embodiment, the pulse width modulator may further include a bit classification part that classifies the frame bits of the frame data into the frame bit of the macro data and the frame bit of the micro data; and a sub-counting part that generates sub-counting information, wherein the 1-st to n-th subframes in the unit frame may be distinguished by the sub-counting information.

In an embodiment, the macro modulation part may include a sub-data generating unit that generates 1-st to n-th sub-data corresponding to the 1-st to n-th subframes, wherein the data values of the 1-st to n-th sub-data may depend on the data value of the macro data; a gray clock generating unit that generates a gray clock signal, wherein a period of the gray clock signal may correspond to the macro unit time; and a macro modulation unit that generates the macro response signal by modulating the 1-st to n-th sub-data with using the gray clock signal, wherein the activation widths of the macro response signal in the 1-st to n-th subframes may correspond to the data values of the 1-st to n-th sub-data.

In an embodiment, 'n' may be a natural number greater than or equal to '4', the activation width of the macro response signal in the i-th subframe may depend on whether the integer value of a cumulative error of the i-th subframe is equal to the integer value of the cumulative error of the (i−1)-th subframe, the cumulative error of the i-th subframe may be $\{(i*r+e)/n\}$, and 'i' may be a natural number between '1' and 'n', 'r' may be a remainder obtained by dividing the data value(G) of the macro data by the 'n', 'r' may be an integer between '0' and '(n-1)', and 'e' may be an arbitrary number.

In an embodiment, the integer value of the cumulative error of a 0-th subframe may be '0'.

In an embodiment, the activation width of the macro response signal in the i-th subframe may correspond to a length of 'a' number of the macro unit time in case that the integer value of the cumulative error of the i-th subframe is equal to the integer value of the cumulative error of the (i−1)-th subframe, and 'a' may be a quotient obtained by dividing the data value (G) of the macro data by 'n'.

In an embodiment, the activation width of the macro response signal in the i-th subframe may correspond to the length of 'a+1' number of the macro unit time in case that the integer value of the cumulative error of the i-th subframe is different from the integer value of the cumulative error of the (i−1)-th subframe.

In an embodiment, the micro response signal may be activated with an activation width corresponding to the micro data in any one of the 1-st to n-th subframe.

In an embodiment, 'e' may be '0'.

In an embodiment, the micro response signal may be activated in the 1-st subframe.

A method of driving a display device may include emitting light, by a light emitting element, with a brightness according to a total amount of current flowing in the light emitting element during a unit frame; allowing, by a data driver, current to flow through the light emitting element for a time corresponding to an activation width of a modulation signal; and generating, by a pulse width modulator, the modulation signal with modulating frame data of the light emitting element of the display panel during the unit frame, wherein the activation width of the modulation signal corresponds to the data value of the frame data, and the frame data includes a sum of a macro data and micro data, and the data value of the micro data is less than or equal to a macro unit data value of the macro data, wherein the unit frame includes 1-st to n-th subframes which are sequentially progressed, and each of the 1-st to n-th subframes is 'p' number of macro unit times, and the macro unit time corresponds to each of the macro unit data value of the macro data and the sum of 'q' number of micro unit times, and the micro unit time corresponds to a micro unit data value of the micro data, wherein 'n' is a natural number greater than or equal to '2', and 'p' is a natural number greater than or equal to '2', and 'q' is a natural number greater than or equal to '2', wherein the pulse width modulator includes a macro modulation part that receives the macro data and generates a macro response signal, wherein an activation width of the macro response signal corresponds to the data value of the macro data and is equal to the macro unit time multiplied by an integer equal to or greater than '0'; a micro modulation part that receives the micro data and generates a micro response signal, wherein an activation width of the micro response signal corresponds to the data value of the micro data and is equal to the micro unit time multiplied by an integer equal to or greater than '0'; an activation summing part that receives the macro response signal and the micro response signal to generate the modulation signal, wherein the activation width of the modulation signal corresponds to the sum of the activation width of the macro response signal and the activation width of the micro response signal; and a micro disable generating part that generates a micro disable signal activated according to the data value of the micro data, wherein the micro disable signal is activated in any of the 1-st to n-th subframe in which the micro response signal is not activated, wherein the micro modulation part is disabled according to the activation of the micro disable signal.

In an embodiment, the method may further include classifying, by a bit classification part of the pulse width modulator, the frame bits of the frame data into the frame bit of the macro data and the frame bit of the micro data; and generating, by a sub-counting part of the pulse width modulator, sub-counting information, wherein the 1-st to n-th subframes in the unit frame may be distinguished by the sub-counting information.

In an embodiment, the method may further include generating, by a sub-data generating unit of the macro modulation part, 1-st to n-th sub-data corresponding to the 1-st to n-th subframes, wherein the data values of the 1-st to n-th sub-data may depend on the data value of the macro data; generating, by a gray clock generating unit of the macro modulation part, a gray clock signal, wherein a period of the gray clock signal may correspond to the macro unit time; and generating, by a macro modulation unit of the macro modulation part, the macro response signal by modulating the 1-st to n-th sub-data with using the gray clock signal, wherein the activation widths of the macro response signal in the 1-st to n-th subframes may correspond to the data values of the 1-st to n-th sub-data.

In an embodiment, 'n' may be a natural number greater than or equal to '4', the activation width of the macro response signal in the i-th subframe may depend on whether the integer value of a cumulative error of the i-th subframe is equal to the integer value of the cumulative error of the (i−1)-th subframe, the cumulative error of the i-th subframe may be $\{(i*r+c)/n\}$, and 'i' may be a natural number between '1' and 'n', 'r' may be a remainder obtained by dividing the data value(G) of the macro data by the 'n', 'r' may be an integer between '0' and '(n−1)', and 'e' may be an arbitrary number.

In an embodiment, the integer value of the cumulative error of a 0-th subframe may be '0'.

In an embodiment, the activation width of the macro response signal in the i-th subframe may correspond to a length of 'a' number of the macro unit time in case that the integer value of the cumulative error of the i-th subframe is equal to the integer value of the cumulative error of the (i−1)-th subframe, and 'a' may be a quotient obtained by dividing the data value (G) of the macro data by 'n'.

In an embodiment, the activation width of the macro response signal in the i-th subframe may correspond to the length of 'a+1' number of the macro unit time in case that the integer value of the cumulative error of the i-th subframe is different from the integer value of the cumulative error of the (i−1)-th subframe.

In an embodiment, the micro response signal may be activated with an activation width corresponding to the micro data in any one of the 1-st to n-th subframe.

In an embodiment, 'e' may be '0'.

In an embodiment, the micro response signal may be activated in the 1-st subframe.

In the display device of the disclosure configured as described above, the activation width of a modulation signal that causes a current to flow in a light emitting element of a display panel, reflects an activation width of a micro response signal that can be divided into a short unit time. Accordingly, the light emitting element that emits light with a brightness corresponding to the activation width of the modulation signal, can implement a high-resolution display image.

In the display device of the disclosure, the micro modulation part that includes a high frequency clock generating unit and a micro modulation unit, may be disabled in a subframe in which the micro response signal is inactivated.

Therefore, according to the display device of the disclosure, current consumption can be reduced while maintaining a high resolution of a display image.

BRIEF DESCRIPTION OF THE DRAWINGS

The above and other objects, features and advantages of the disclosure will become more apparent to those skilled in the art by describing in detail embodiments thereof with reference to the accompanying drawings, in which.

DETAILED DESCRIPTION OF THE EMBODIMENTS

Figure 1:
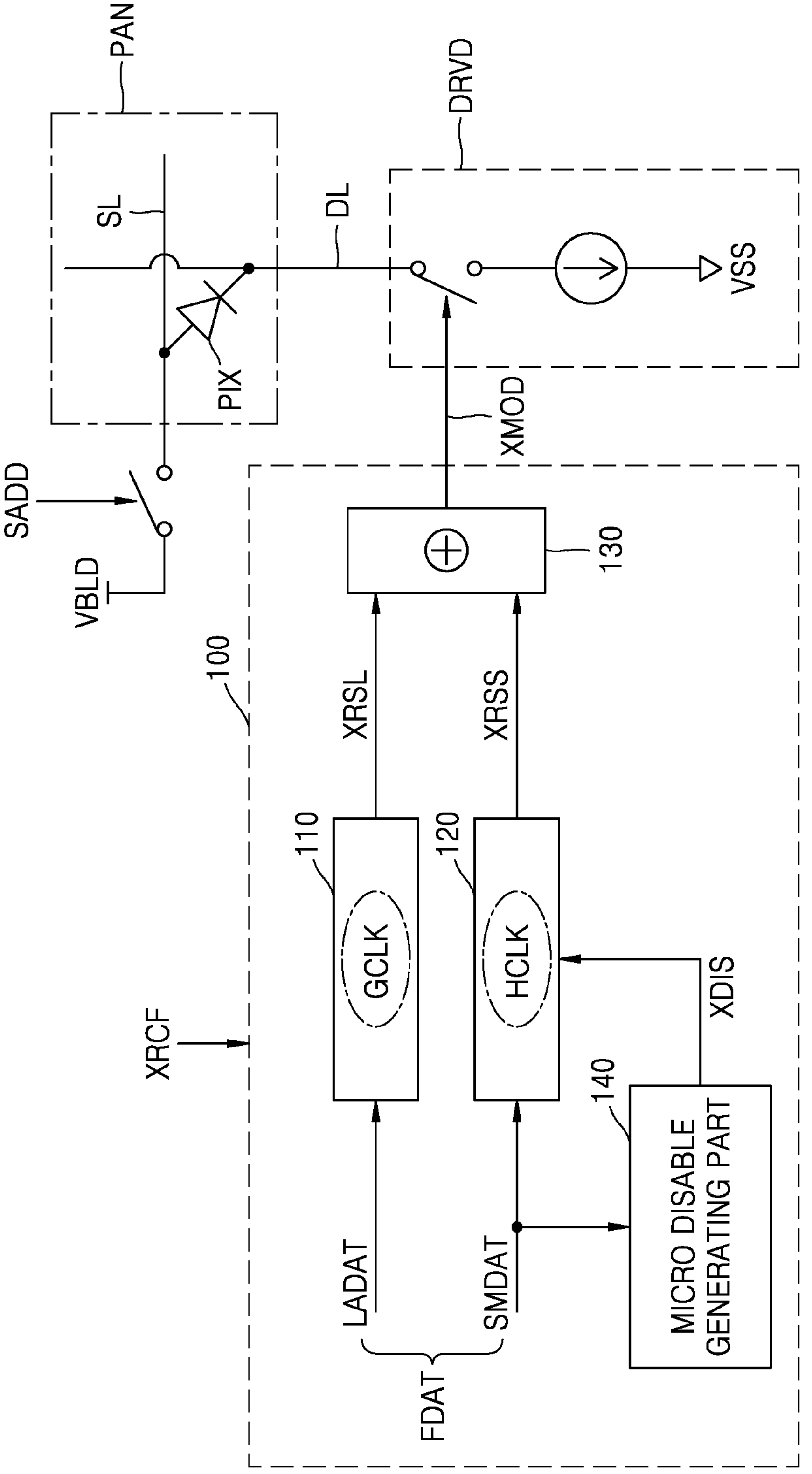
FIG. 1 is a schematic drawing showing the display device according to an embodiment of the disclosure.

Embodiments of the disclosure will be described in detail below with reference to the accompanying drawings. While the disclosure is shown and described in connection with embodiments thereof, it will be apparent to those skilled in the art that various modifications can be made without departing from the spirit and scope of the disclosure. Thus, the scope of the disclosure is not limited to these particular following embodiments.

The terminology used herein is for the purpose of describing particular embodiments only and is not intended to be limiting of the disclosure. As used herein, the singular forms, such as "a" and "an," are intended to include the plural forms as well, unless the context clearly indicates otherwise. It will be further understood that the terms "comprises" and/or "comprising." or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

As customary in the field, some embodiments are described and illustrated in the accompanying drawings in terms of functional blocks, units, parts, and/or modules. Those skilled in the art will appreciate that these blocks, units, parts, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, parts, and/or modules being implemented by microprocessors or other similar hardware, they may be programmed and controlled using software (e.g., microcode) to perform various functions discussed herein and may optionally be driven by firmware and/or software. It is also contemplated that each block, unit, part, and/or module may be implemented by dedicated hardware, or as a combination of dedicated hardware to perform some functions and a processor (e.g., one or more programmed microprocessors and associated circuitry) to perform other functions. Also, each block, unit, part, and/or module of some embodiments may be physically separated into two or more interacting and discrete blocks, units, parts, and/or modules without departing from the scope of the disclosure. Further, the blocks, units, parts, and/or modules of some embodiments may be physically combined into more complex blocks, units, parts, and/or modules without departing from the scope of the disclosure.

The term "and/or" includes all combinations of one or more of which associated configurations may define. For example, "A and/or B" may be understood to mean "A, B, or A and B."

For the purposes of this disclosure, the phrase "at least one of A and B" may be construed as A only, B only, or any combination of A and B. Also, "at least one of X, Y, and Z" and "at least one selected from the group consisting of X, Y, and Z" may be construed as X only, Y only, Z only, or any combination of two or more of X, Y, and Z.

The phrase "equal to" as used herein may mean "substantially equal to."

Unless otherwise defined or implied herein, all terms (including technical and scientific terms) used herein have the same meaning as commonly understood by those skilled in the art to which this disclosure pertains. It will be further understood that terms, such as those defined in commonly used dictionaries, should be interpreted as having a meaning that is consistent with their meaning in the context of the relevant art and the disclosure, and should not be interpreted in an ideal or excessively formal sense unless clearly so defined herein.

Hereinafter, embodiment of the disclosure will be described in detail with reference to the accompanying drawings.

FIG. 1 is a schematic drawing showing the display device according to an embodiment of the disclosure. Referring to FIG. 1, the display device of the disclosure may comprise a display panel PAN, a data driver DRVD, and/or a pulse width modulator 100.

In the display panel PAN, a light emitting element PIX may be included. The display panel PAN may include multiple light emitting elements PIX specified by a corresponding scan line SL and a corresponding data line DL. However, in FIG. 1, only one light emitting element PIX, which may be implemented as an LED, is representatively shown for simplicity of description.

The light emitting element PIX may emit light with a brightness according to the total amount of current flowing therein during a unit frame UFR. See FIG. 3.

Here, the unit frame UFR means a time period in which a light emitting element PIX emits light with a brightness according to the data value of the corresponding frame data FDAT to display a unit image.

The data driver DRVD may be driven to allow current to flow through the light emitting element PIX of the display panel PAN for the time corresponding to the "H" activation width of a modulation signal XMOD.

For example, the scan line SL corresponding to the scan address SADD may be activated to the emission voltage VBLD, and the corresponding data line DL may be controlled to the ground voltage VSS by the activation of the modulation signal XMOD. In this case, current flows through the light emitting element PIX. In case that the intensity of the current, e.g., the luminous intensity, is constant, the brightness of the light emitting device PIX may correspond to the sum of the activation times of the modulation signals XMOD, e.g., the sum of the light emission times.

The pulse width modulator 100 may be driven to generate the modulation signal XMOD with modulating a frame data FDAT of the light emitting element of the display panel PAN during the unit frame UFR. In this case, the activation width of the modulation signal XMOD may correspond to the data value of the frame data FDAT.

Subsequently, the frame data FDAT is described in more detail.

Figure 2:
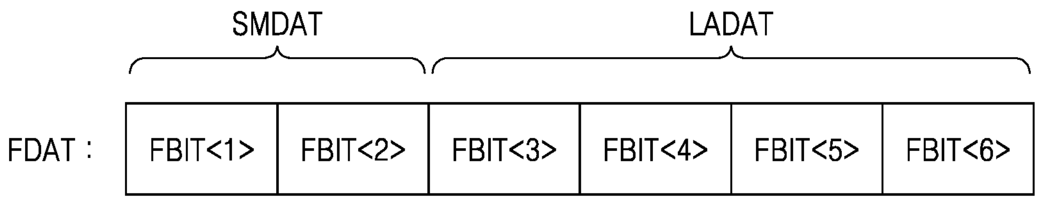
FIG. 2 is a schematic diagram for explaining the frame data of FIG. 1.

FIG. 2 is a schematic diagram for explaining the frame data FDAT of FIG. 1. Referring to FIG. 2, in this embodiment, the data value of the frame data FDAT may be represented by 1-st to 6-th frame bits FBIT<1> to FBIT<6>. Here, the 1-st frame bit FBIT<1> may be the least significant bit, and the 6-th frame bit FBIT<6> may be the most significant bit.

The data value of the frame data FDAT, which may be represented by the 1-st to the 6-th frame bits FBIT<1> to FBIT<6>, may be 64-number from '0' to '63'.

In this specification, it is assumed that the data value of the frame data FDAT is '46'. In this case, the logical states of the 1-st to the 6-th frame bits FBIT<1> to FBIT<6> are shown in (Table 1).

TABLE 1

| FBIT<1> | FBIT<2> | FBIT<3> | FBIT<4> | FBIT<5> | FBIT<6> |
|---|---|---|---|---|---|
| H | L | H | H | H | L |

The frame data FDAT may include a macro data LADAT and a micro data SMDAT. In other words, the sum of the data values of the macro data LADAT and the data values of the micro data SMDAT may correspond to the data value of the frame data FDAT.

The data value of the macro data LADAT may be represented with the 3-rd to the 6-th frame bits FBIT<3> to FBIT<6>, and the data value of micro data SMDAT may be represented with the 1-st to the 2-nd frame bits FBIT<1> to FBIT<2>.

For example, in the case of (Table 1), the data value of the macro data LADAT may correspond to '11'-number of macro unit data value, and the data value of the micro data SMDAT may correspond to '2'-number of micro unit data value. The macro unit data value of the macro data LADAT may correspond to 4 times of the frame unit data value of the frame data FDAT. The micro unit data value of the micro data SMDAT may be the frame unit data value of the frame data FDAT. Therefore, the macro unit data value of the macro data LADAT may correspond to 4 times the micro unit data value of the micro data SMDAT.

In this embodiment, the data value of '11' of the macro data LADAT may correspond to '44' number of frame unit data value of the frame data FDAT. The micro data value of '2' of the micro data SMDAT may correspond to '2' number of frame unit data value of the frame data FDAT.

Next, the unit frame UFR and related terms will be described in more detail.

Figure 3:
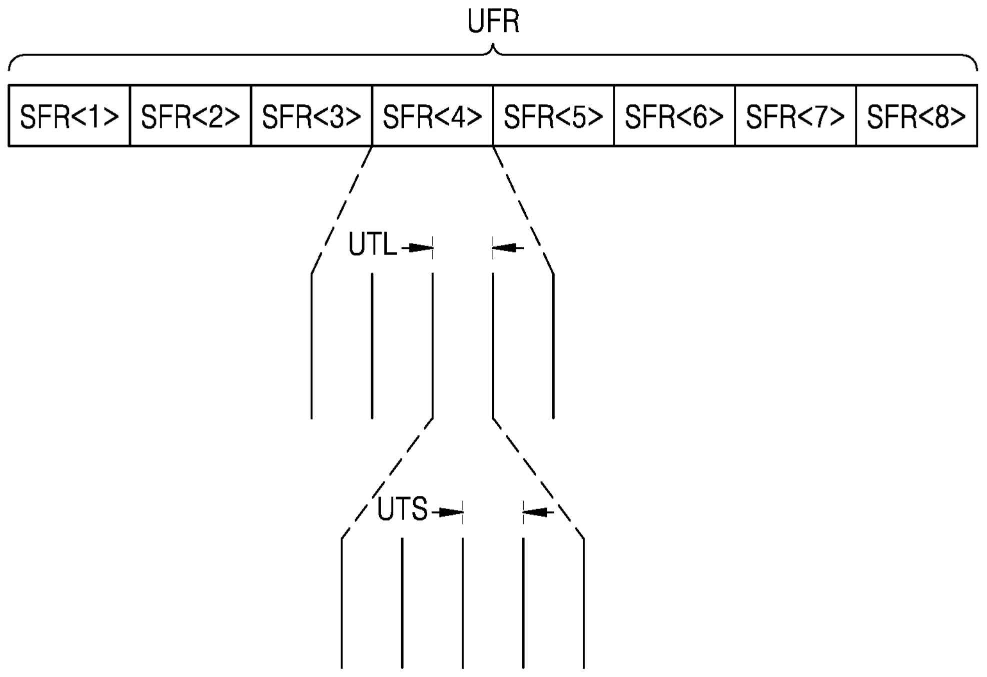
FIG. 3 is a schematic diagram for explaining the unit frame of FIG. 1 and terms related thereto.

FIG. 3 is a schematic diagram for explaining the unit frame of FIG. 1 and terms related thereto.

Referring to FIG. 3, the unit frame UFR may include 'n' number of subframes SFR which are sequentially progressed or sequentially processed. Here, 'n' is a natural number greater than or equal to '2', or 4 or more. In this embodiment, 'n' is assumed to be '8'.

For example, in this embodiment, 1-st to 8-th subframes SFR<1:8> are sequentially progressed.

Each of the 1-st to the 8-th subframes SFR<1:8> is 'p' number of macro unit times UTL. Here, 'p' is a natural number greater than or equal to '2', and is assumed to be '4' in this embodiment.

The macro unit time UTL may correspond to the macro unit data value of the macro data LADAT. The macro unit time UTL may be set based on 1/2 cycle of the gray clock signal GCLK, in this embodiment.

The macro unit time UTL may correspond to the sum of 'q' number of micro unit times UST. Here, 'q' is a natural number greater than or equal to '2', and is assumed to be '4' in this embodiment.

The micro unit time UTS may correspond to the micro unit data value of the micro data SMDAT. The micro unit time UTS may be set based on 1/2 cycle of the high frequency clock signal HCLK, in this embodiment. Here, the frequency of the high frequency clock signal HCLK is q-times, for example, 4-times the frequency of the gray clock signal GCLK.

Referring again to FIG. 1, the pulse width modulator 100 may include a macro modulation part 110, a micro modulation part 120, an activation summing part 130, and/or a micro disable generating part 140. Each component included in the pulse modulator 100 can be operated at an appropriate timing based on the transition of a reference timing signal XRCF.

The macro modulation part 110 may be driven to receive the macro data LADAT. The macro modulation part 110 may be driven to generate a macro response signal XRSL with using the gray clock signal GCLK. The activation width of the macro response signal XRSL may correspond to the data value of the macro data LADAT, and may be an integer multiple of '0' or more with respect to the macro unit time UTL.

The micro modulation part 120 may be driven to receive the micro data SMDAT. The micro modulation part 120 may be driven to generate a micro response signal XRSS with using the high frequency clock signal HCLK. The activation width of the micro response signal XRSS may correspond to the data value of the micro data SMDAT, and may be an integer multiple of '0' or more with respect to the macro unit time UTS.

The frequency of the high frequency clock signal HCLK may be greater than the frequency of the gray clock signal GCLK, which is as described above. Therefore, the current consumption in the micro modulation part 120 may be relatively greater than the current consumption in the macro modulation part 110.

The activation summing part 130 may be driven to receive the macro response signal XRSL and the micro response signal XRSS for generating the modulation signal XMOD. The activation width of the modulation signal XMOD may correspond to the sum of the activation width of the macro response signal XRSL and the activation width of the micro response signal XRSS.

As such, the activation width of the modulation signal XMOD may be determined with summing the activation width of the micro response signal XRSS. Therefore, the light emitting device PIX that emits light with brightness corresponding to the activation width of the modulation signal XMOD, can implement a high-resolution display image.

The micro disable generating 140 may be driven to generate a micro disable signal (or micro disabling signal) XDIS with checking the micro data SMDAT. The micro disable signal XDIS may be activated according to the data value of the micro data SMDAT. For example, the micro disable signal XDIS may be activated in any of the 1-st to the 8-th subframes SFR <1:8> in which the micro response signal XRSS is not activated.

The micro modulation part 120 may be disabled according to the activation of the micro disable signal XDIS. For example, the micro modulation part 120 may be disabled in the subframe SFR in which the micro response signal XRSS is not activated.

Therefore, according to the display device of the disclosure, current consumption can be reduced with maintaining a high resolution of a display image.

Subsequently, the pulse width modulator 100 of FIG. 1 will be described in more detail.

Figure 4:
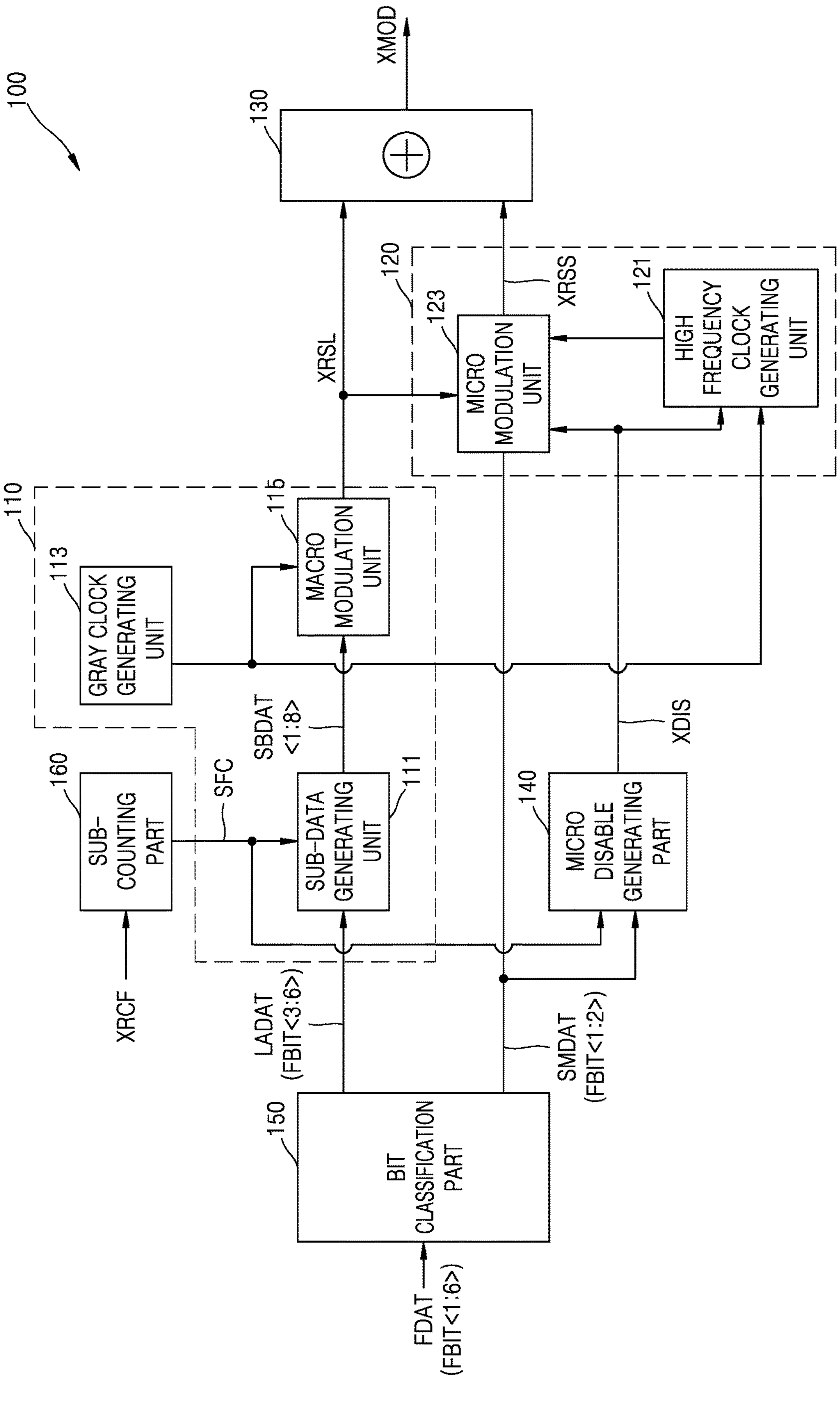
FIG. 4 is a schematic drawing showing the pulse width modulator of FIG. 1.

FIG. 4 is a schematic drawing showing the pulse width modulator 100 of FIG. 1. Referring to FIG. 4, the pulse width modulator 100 may include the macro modulation part 110, the micro modulation part 120, the activation summing part 130, and/or the micro disable generating part 140, as described above. The pulse width modulator 100 may further include a bit classification part 150 and a sub-counting part 160.

The bit classification part 150 may be driven to classify the 1-st to the 6-th frame bits FBIT<1:6> of the frame data FDAT into the 3-rd to the 6-th frame bits FBIT<3:6> and the 1-st to the 2-nd frame bits FBIT<1:2>. Here, the 3-rd to the 6-th frame bits FBIT<3:6> may represent the data value of the macro data LADAT, and the 1-st to the 2-nd frame bits FBIT<1:2> may represent the data value of the micro data SMDAT.

The sub-counting part 160 may be driven to generate sub-counting information SFC. The timing of the sub-counting unit 160 may be controlled by the reference timing signal XRCF.

The 1-st to the 8-th subframes SFR<1:8> in the unit frame UFR may be distinguished by the sub-counting information SFC. For example, according to the counting information of the sub counting information SFC, the 1-st to the 8-th subframes SFR<1> to SFR<8> may be sequentially processed.

Subsequently, the macro modulation part 110 and the micro modulation part 120 will be described in more detail.

The macro modulation part 110 may include a sub-data generating unit 111, a gray clock generating unit 113, and/or a macro modulation unit 115.

Figure 5:
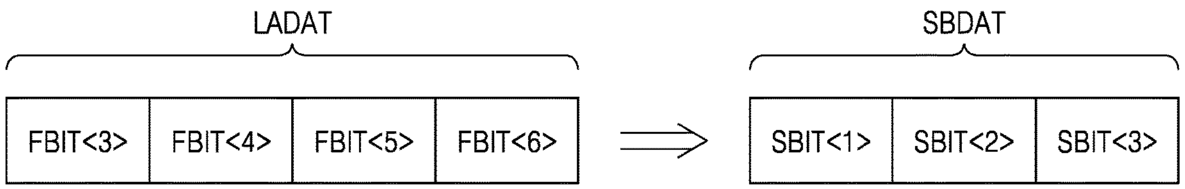
FIG. 5 is a schematic diagram for explaining generation of sub-data in the sub-data generating unit of FIG. 4.

The sub-data generating unit 111 may generate the 1-st to the 8-th sub-data SBDAT<1:8>, which may correspond to the 1-st to the 8-th subframes SFR<1:8>, with using the macro data LADAT, as shown in FIG. 5. Here, the data values of the 1-st to the 8-th sub-data SBDAT<1:8> may depend on the data value of the macro data LADAT. The data values of the 1-st to the 8-th sub-data SBDAT<1:8> may be represented by the 1-st to the 3-rd sub bits SBIT<1:3>.

In case that the 3-rd sub-bit SBIT<3> is 'H', the 1-st to the 2-nd sub bits SBIT<1:2> may be 'L'. Accordingly, the data values of each of the 1-st to the 8-th sub data SBDAT<1:8> may be '0', 'l', '2', '3', and '4'.

The gray clock generating unit 113 may generate the gray clock signal GCLK. The period of the gray clock signal GCLK may correspond to the macro unit time UTL.

The macro modulation unit 115 may be driven to generate the macro response signal XRSL by modulating the 1-st to the 8-th sub-data SBDAT<1:8> with using the gray clock signal GCLK. The activation widths of the macro response signal XRSL in the 1-st to the 8-th subframes SFR<1:8> may correspond to the data values of the 1-st to the 8-th sub-data SBDAT<1:8>.

Subsequently, the number of the macro unit time UTL of each subframe SFR, in which the macro response signal XRSL is activated, is examined.

In this embodiment, the relationship between the data value (G) of the macro data LADAT and the number of subframe SFR, for example, 'n', is as shown in (Equation 1).

$$G=(a*n)+r \qquad \text{(Equation 1)}$$

Here, the 'a' is a quotient obtained by dividing the data value (G) of the macro data LADAT by the 'n'. The 'r' is a remainder obtained by dividing the data value (G) of macro data LADAT by the 'n'.

The activation width of the macro response signal XRSL in the i-th subframe SFR<i> may depend on whether the integer value of the cumulative error (or approximated cumulative error; hereinafter "cumulative error") of the i-th subframe SFR<i> is equal to the integer value of the cumulative error of the (i−1)-th subframe SFR<i-1>. Here, 'i' is a natural number between 'l' and 'n'.

The cumulative error ACR<i> of the i-th subframe SFR<i> may be defined by (Equation 2).

$$ACR<i>=(i*r+e)/n \qquad \text{(Equation 2)}$$

Here, the 'e' is an arbitrary number.

In this case, 'e' is a number for determining the position of the subframe SFR having a relatively large activation width of the macro response signal XRSL, and may be referred to as 'position determination number' in this specification.

The 0-th subframe is a virtual frame, and the integer value of the cumulative error of the 0-th subframe is regarded as '0'.

In this case, the activation width of the macro response signal XRSL in the i-th subframe SFR<i> may be as follows.

First, in case that the integer value INT<i> of the cumulative error ACR<i> of the i-th subframe SFR <i> is equal to the integer value INT<i-1> of the cumulative error ACR<i-1> of the (i−1)-th subframe SFR<i-1>, the activation width of the macro response signal XRSL in the i-th subframe SFR<i> may correspond to the length of 'a' number of the macro unit times UTL.

In case that the integer value INT<i> of the cumulative error ACR<i> of the i-th subframe SFR<i> is different from the integer value INT<i-1> of the cumulative error ACR<i-1> of the (i−1)-th subframe SFR<i-1>, the activation width of the macro response signal XRSL in the i-th subframe SFR <i> may correspond to the length of 'a+1' number of the macro unit times UTL.

In an embodiment, 'e' is '0'. In this case, with respect to any data value of the macro data LADAT, the activation width of the macro response signal XRSL in the 1-st subframe SFR <1> may be relatively short.

Subsequently, the modulation of the data value of the macro data LADAT to the activation width of the macro response signal XRSL will be described in detail, with reference to FIG. 6.

In this embodiment, it is assumed that the data value (G) of the macro data LADAT is '11'. In this case, in case that the data value (G) of the macro data LADAT is divided by the number (n) of the subframe SFR, the quotient (a) is '1' and the remainder (r) is '3'.

The cumulative errors ACR in the 1-st to the 8-th subframes SFR<1:8> are shown in (Table 2).

(Table 2) shows the case that the position determination number (e) is '0'.

TABLE 2

| | SRF <1> | SRF <2> | SRF <3> | SRF <4> | SRF <5> | SRF <6> | SRF <7> | SRF <8> |
|---|---|---|---|---|---|---|---|---|
| (i * r + e) | 3 | 6 | 9 | 12 | 15 | 18 | 21 | 24 |
| ACR<i> = {(i * r + e)/n} | 0.375 | 0.750 | 1.125 | 1.500 | 1.875 | 2.250 | 2.625 | 3.000 |
| INT<i> = integer of {(i * r + e)/n} | 0 | 0 | 1 | 1 | 1 | 2 | 2 | 3 |
| activation width of XRSL | 1 * UTL (a * UTL) | 1 * UTL (a * UTL) | 2 * UTL ((a + 1) * UTL) | 1 * UTL (a * UTL) | 1 * UTL (a * UTL) | 2 * UTL ((a + 1) * UTL) | 1 * UTL (a * UTL) | 2 * UTL ((a + 1) * UTL) |

In the case of (Table 2), the subframes in which the integer value INT of the cumulative error ACR of the present subframe SFR is equal to the integer value INT of the cumulative error ACR of the previous subframe SFR, are the 1-st subframe SFR<1>, the 2-nd subframe SFR<2>, the 4-th subframe SFR<4>, the 5-th subframe SFR<5>, and the 7-th subframe SFR<7>.

The subframes in which the integer value INT of the cumulative error ACR of the present subframe SFR is different from the integer value INT of the cumulative error ACR of the previous subframe SFR, are the 3-rd subframe SFR<3>, the 6-th subframe SFR<6> and the 8-th subframe SFR<8>.

Figure 6:
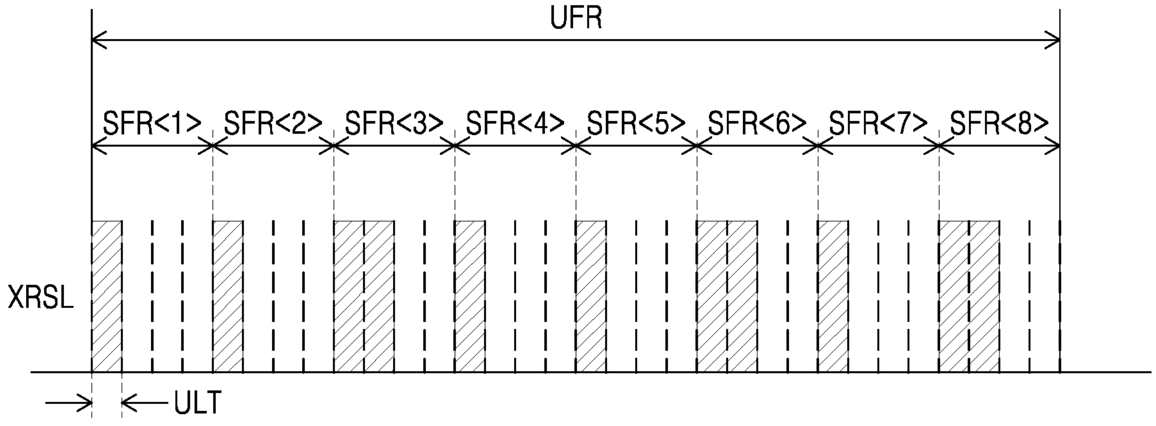
FIG. 6 is a schematic diagram for explaining the activation width of the macro response signal provided from the macro modulation part of FIG. 1.

In the case of (Table 2), the activation width of the macro response signal XRSL in each subframe SFR is as shown in FIG. 6.

In other words, in each of the 1-st subframe SFR<1>, the 2-nd subframe SFR<2>, the 4-th subframe SFR<4>, the 5-th subframe SFR<5>, and the 7-th subframe SFR<7>, the activation width of the macro response signal XRSL may correspond to 'a' number of the macro unit time UTL, for example, '1' number of the macro unit time UTL.

In each of the 3-rd subframe SFR<3>, the 6-th subframe SFR<6>, and the 8-th subframe SFR<8>, the activation width of the macro response signal XRSL may correspond to 'a+1' number of the macro unit time UTL, for example, '2' number of the macro unit time UTL.

As a result, in the case of (Table 2), the subframes SFR, in which the activation width of the macro response signal XRSL corresponds to 'a+1' number of the macro unit time UTL may not continuously progressed.

In a display device of the disclosure, the macro unit time UTL, in which the macro response signal XRSL is activated, for example, the activation width, is determined according to the data value of the macro data LADAT of the light emitting element PIX. The activation width of the macro response signal XRSL of each subframe SFR may be different from each other. In this case, in the display device of the disclosure, at least one of the subframes SFRs having a relatively large activation width time of the macro response signal XRSL and the subframes SFRs having a relatively small activation width of the macro response signal XRSL may be prevented from being continuously arranged.

Accordingly, in the display device of the disclosure, subframes having different activation widths of the macro response signals XRSL are distributed. As a result, according to the display device of the disclosure, the flicker phenomenon may be alleviated.

Continuously referring to FIG. 4, the micro modulation part 120 may include a high frequency clock generating unit 121 and a micro modulation unit 123.

The high frequency clock generating unit 121 may be driven to generate the high frequency clock signal HCLK by dividing the frequency of the gray clock signal GCLK by a factor of q, for example, by a factor of 4. The high frequency clock generating unit 121 may be disabled according to the activation of the micro disable signal XDIS.

The micro modulation unit 123 may be driven to modulate the micro data SMDAT using the high frequency clock signal HCLK to generate the micro response signal XRSS. The micro response signal XRSS may be activated with the activation width corresponding to the micro data SMDAT in any one of the 1-st to the 8-th sub-data SBDAT<1:8>.

In an embodiment, the activation of the micro response signal XRSS may start at the end point of the activation of the macro response signal XRSL.

In an embodiment, the micro response signal XRSS may be activated in the 1-st subframe SFR<1> with the activation width corresponding to the micro data SMDAT.

The activation width of the macro response signal XRSL may be relatively short for any data value of the macro data LADAT in the 1-st subframe SFR<1>.

Accordingly, the expansion of the difference in the activation width of the modulation signal XMOD between the subframes SFR may be prevented.

As described above, the activation width of the modulation signal XMOD, which is provided by the activation summing unit 130, may correspond to the sum of the activation width of the macro response signal XRSL and the activation width of the micro response signal XRSS. The activation width of the modulation signal XMOD is shown in (Table 3).

TABLE 3

| | SRF <1> | SRF <2> | SRF <3> | SRF <4> | SRF <5> | SRF <6> | SRF <7> | SRF <8> |
|---|---|---|---|---|---|---|---|---|
| activation width of XRSL | 1 * UTL (4 * UTS) | 1 * UTL (4 * UTS) | 2 * UTL (8 * UTS) | 1 * UTL (4 * UTS) | 1 * UTL (4 * UTS) | 2 * UTL (8 * UTS) | 1 * UTL (4 * UTS) | 2 * UTL (8 * UTS) |
| activation width of XRSS | 2 * UTS | 0 | 0 | 0 | 0 | 0 | 0 | 0 |
| activation width of XMOD | 6 * UTS | 4 * UTS | 8 * UTS | 4 * UTS | 4 * UTS | 8 * UTS | 4 * UTS | 8 * UTS |

Figure 7A:
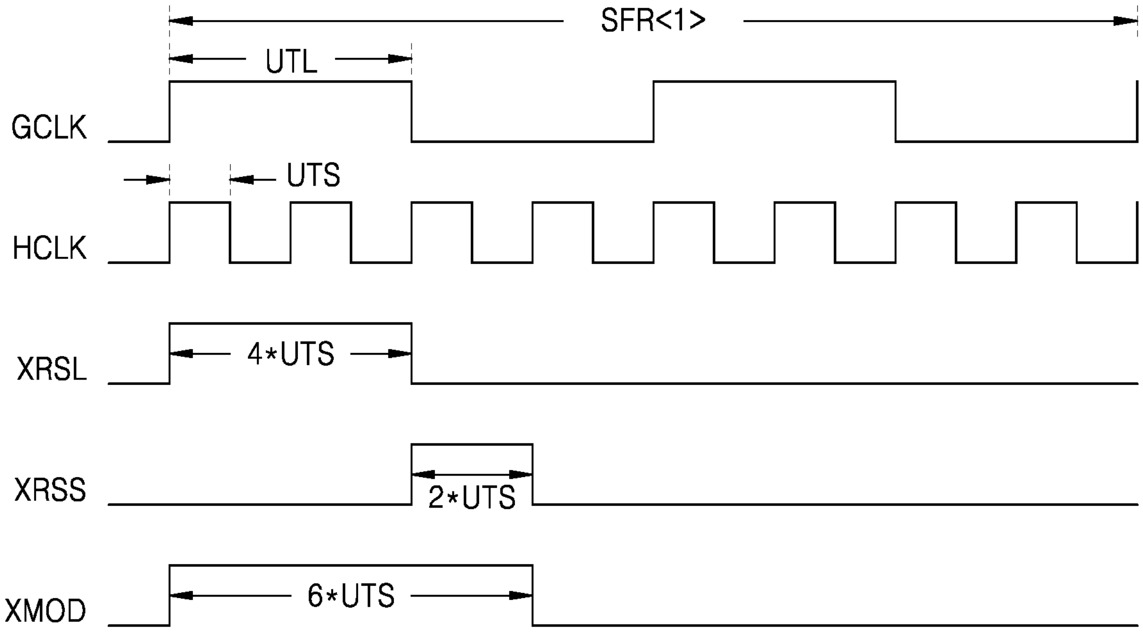
FIG. 7A to FIG. 7C are schematic timing diagrams for explaining an activation width of a modulation signal in each subframe.
Figure 7B:
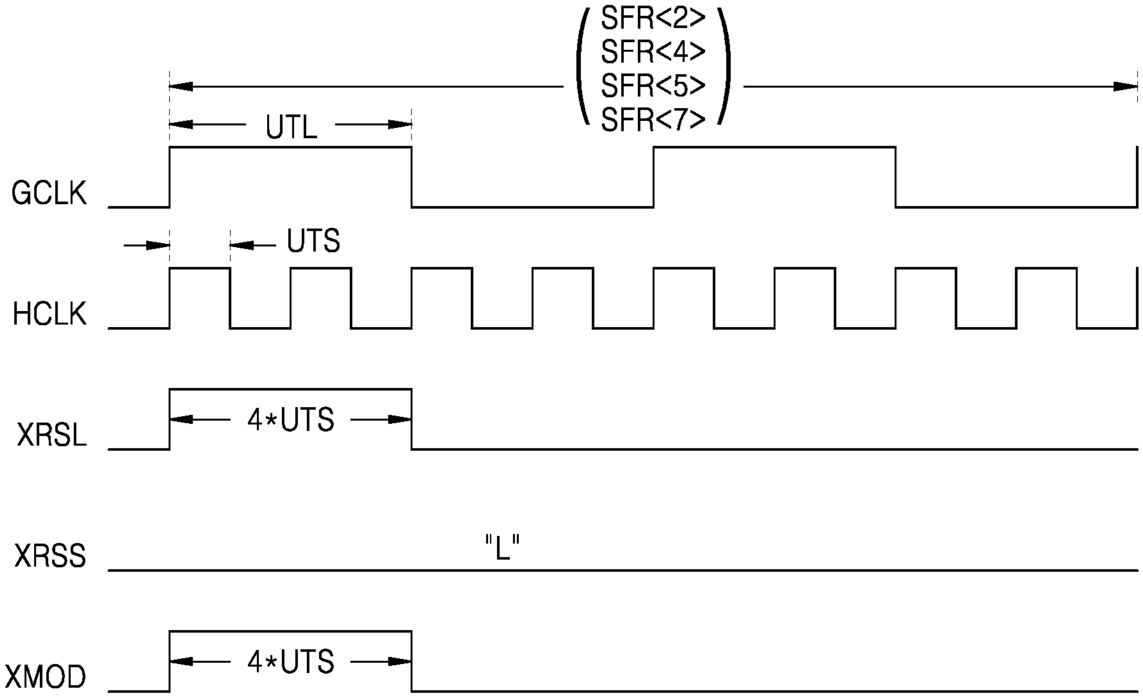
Figure 7C:
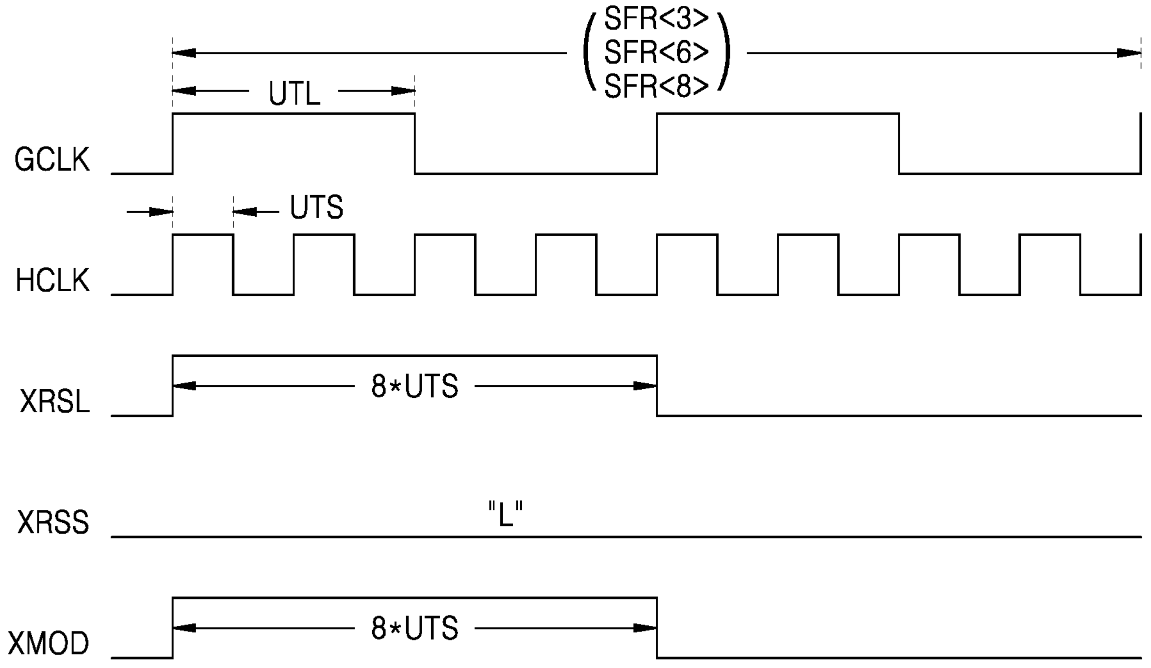

With reference to FIG. 7A to FIG. 7C, the activation width of the modulation signal XMOD in each of the 1-st to the 8-th subframes SFR<1:8> will be examined in detail.

FIG. 7A is a schematic timing diagram for explaining the activation width of the modulation signal XMOD in the 1-st subframe SFR<1>.

In the 1-st subframe SFR<1>, the activation width of the macro response signal XRSL may correspond to the length of 1-number of the macro unit time UTL, for example, 4-number of the micro unit time UTS. The activation width of the micro response signal XRSS may correspond to the length of 2-number of the micro unit time UTS.

Accordingly, in the 1-st subframe SFR<1>, the activation width of the modulation signal XMOD may correspond to 6-number of the micro unit time UTS, which is the sum of the activation width of the macro response signal XRSL and the activation width of the micro response signal XRSS.

FIG. 7B is a schematic timing diagram for explaining the activation width of the modulation signal XMOD in each of the 2-nd subframe SFR <2>, the 4-th subframe SFR<4>, the 5-th subframe SFR <5> and the 7-th subframe SFR<7>.

In each of the 2-nd subframe SFR<2>, the 4-th subframe SFR<4>, the 5-th subframe SFR <5> and the 7-th subframe SFR<7>, the activation width of the macro response signal XRSL may correspond to the length of 1-number of the macro unit time UTL, for example, 4-number of the micro unit time UTS. And, the micro response signal XRSS is not activated.

Accordingly, in each of the 2-nd subframe SFR <2>, the 4-th subframe SFR<4>, the 5-th subframe SFR<5> and the 7-th subframe SFR<7>, the activation width of the modulation signal XMOD may correspond to 4-number of the micro unit time UTS, which is the activation width of the macro response signal XRSL.

FIG. 7C is a schematic timing diagram for explaining the activation width of the modulation signal XMOD in each of the 3-rd subframe SFR<3>, the 6-th subframe SFR<6> and the 8-th subframe SFR<8>.

In each of the 3-rd subframe SFR<3>, the 6-th subframe SFR<6> and the 8-th subframe SFR<8>, the activation width of the macro response signal XRSL may correspond to the length of 2-number of the macro unit time UTL, for example, 8-number of the micro unit time UTS. The micro response signal XRSS may not be activated.

Accordingly, in each of the 3-rd subframe SFR<3>, the 6-th subframe SFR<6> and the 8-th subframe SFR<8>, the activation width of the modulation signal XMOD may correspond to 8-number of the micro unit time UTS, which is the activation width of the macro response signal XRSL.

As a result, the activation width of the modulation signal XMOD in each subframe SFR may correspond to 4 to 8 number of the micro unit time UTS. For example, the expansion of the difference in the activation width of the modulation signal XMOD between the subframes SFR may be prevented.

In summary, in a display device of the disclosure, the activation width of the modulation signal XMOD that causes a current to flow in a light emitting element PIX of the display panel PAN, reflects the activation width of the micro response signal XRSS that can be divided into a short unit time. Accordingly, the light emitting element PIX that emits light with a brightness corresponding to the activation width of the modulation signal XMOD, can implement a high-resolution display image.

In a display device of the disclosure, the micro modulation part 120, which includes the high frequency clock generating unit 121 and the micro modulation unit 123, may be disabled in a subframe in which the micro response signal XRSS is inactivated.

Therefore, according to a display device of the disclosure, current consumption can be reduced with maintaining a high resolution of a display image.

While the disclosure has been described with reference to the embodiments shown in the drawings, these embodiments are merely illustrative and it should be understood that various modifications and other equivalent embodiments can be derived by those skilled in the art on the basis of the embodiments.

It will be apparent to those skilled in the art that various modifications can be made to the above-described embodiments of the disclosure without departing from the spirit or scope of the disclosure. Thus, it is intended that the disclosure covers all such modifications provided they come within the scope of the appended claims and their equivalents.

What is claimed is:

1. A display device comprising: a display panel including a light emitting element, wherein the light emitting element emits light with a brightness according to a total amount of current flowing in the light emitting element during a unit frame; a data driver that allows current to flow through the light emitting element of the display panel for a time corresponding to an activation width of a modulation signal; and a pulse width modulator that generates the modulation signal with modulating frame data of the light emitting element of the display panel during the unit frame, wherein the activation width of the modulation signal corresponds to data value of the frame data, and the frame data includes a sum of macro data and micro data, and the data value of the micro data is less than or equal to a macro unit data value of the macro data, wherein the unit frame includes 1-st to n-th subframes which are sequentially progressed, and each of the 1-st to n-th subframes is ‘p’ number of macro unit times, and the macro unit time corresponds to each of the macro unit data value of the macro data and the sum of ‘q’ number of micro unit times, and the micro unit time corresponds to a micro unit data value of the micro data, wherein 'n' is a natural number greater than or equal to '2', and 'p' is a natural number greater than or equal to '2', and 'q' is a natural number greater than or equal to '2', wherein the pulse width modulator includes: a macro modulation part that receives the macro data and generates a macro response signal, wherein an activation width of the macro response signal corresponds to the data value of the macro data and is equal to the macro unit time multiplied by an integer equal to or greater than '0'; a micro modulation part that receives the micro data and generates a micro response signal, wherein an activation width of the micro response signal corresponds to the data value of the micro data and is equal to the micro unit time multiplied by an integer equal to or greater than '0'; an activation summing part that receives the macro response signal and the micro response signal to generate the modulation signal, wherein the activation width of the modulation signal corresponds to the sum of the activation width of the macro response signal and the activation width of the micro response signal; and a micro disable generating part that generates a micro disable signal activated according to the data value of the micro data, wherein the micro disable signal is activated in any of the 1-st to n-th subframe in which the micro response signal is not activated, wherein the micro modulation part is disabled according to the activation of the micro disable signal.

2. The display device of claim 1, wherein the pulse width modulator further includes: a bit classification part that classifies frame bits of the frame data into frame bit of the macro data and frame bit of the micro data; and a sub-counting part that generates sub-counting information, wherein the 1-st to n-th subframes in the unit frame are distinguished by the sub-counting information.

3. The display device of claim 1, wherein the macro modulation part includes:

a sub-data generating unit that generates 1-st to n-th sub-data corresponding to the 1-st to n-th subframes, wherein the data values of the 1-st to n-th sub-data depends on the data value of the macro data;

a gray clock generating unit that generates a gray clock signal, wherein a period of the gray clock signal corresponds to the macro unit time; and a macro modulation unit that generates the macro response signal by modulating the 1-st to n-th sub-data with using the gray clock signal, wherein the activation widths of the macro response signal in the 1-st to n-th subframes correspond to the data values of the 1-st to n-th sub-data.

4. The display device of claim 1, wherein 'n' is a natural number greater than or equal to '4', the activation width of the macro response signal in i-th subframe depends on whether a integer value of a cumulative error of the i-th subframe is equal to the integer value of the cumulative error of (i−1)-th subframe, the cumulative error of the i-th subframe is {(i*r+e)/n), and i' is a natural number between '1' and 'n', 'r' is a remainder obtained by dividing the data value(G) of the macro data by the 'n', 'r' is an integer between '0' and '(n−1)', and 'e' is an arbitrary number.

5. The display device of claim 4, wherein the integer value of the cumulative error of a 0-th subframe is '0'.

6. The display device of claim 5, wherein the activation width of the macro response signal in the i-th subframe corresponds to a length of 'a' number of the macro unit time in case that the integer value of the cumulative error of the i-th subframe is equal to the integer value of the cumulative error of the (i−1)-th subframe, and 'a' is a quotient obtained by dividing the data value (G) of the macro data by 'n'.

7. The display device of claim 6, wherein the activation width of the macro response signal in the i-th subframe corresponds to the length of 'a+1' number of the macro unit time in case that the integer value of the cumulative error of the i-th subframe is different from the integer value of the cumulative error of the (i−1)-th subframe.

8. The display device of claim 4, wherein the micro response signal is activated with an activation width corresponding to the micro data in any one of the 1-st to n-th subframe.

9. The display device of claim 4, wherein 'e' is '0'.

10. The display device of claim 8, wherein the micro response signal is activated in the 1-st subframe.

11. A method of driving a display device, comprising: emitting light, by a light emitting element, with a brightness according to a total amount of current flowing therein during a unit frame; allowing, by a data driver, current to flow through the light emitting element for a time corresponding to an activation width of a modulation signal; and generating, by a pulse width modulator, the modulation signal with modulating frame data of the light emitting element of the display panel during the unit frame, wherein the activation width of the modulation signal corresponds to data value of the frame data, and the frame data includes a sum of macro data and micro data, and the data value of the micro data is less than or equal to a macro unit data value of the macro data, wherein the unit frame includes 1-st to n-th subframnes which are sequentially progressed, and each of the 1-st to n-th subframes is 'p' number of macro unit times, and the macro unit time corresponds to each of the macro unit data value of the macro data and the sum of 'q' number of micro unit times, and the micro unit time corresponds to a micro unit data value of the micro data, wherein 'n' is a natural number greater than or equal to '2', and 'p' is a natural number greater than or equal to '2', and 'q' is a natural number greater than or equal to '2', wherein the pulse width modulator includes: a macro modulation part that receives the macro data and generates a macro response signal, wherein an activation width of the macro response signal corresponds to the data value of the macro data and is equal to the macro unit time multiplied by an integer equal to or greater than '0'; a micro modulation part that receives the micro data and generates a micro response signal, wherein an activation width of the micro response signal corresponds to the data value of the micro data and is equal to the micro unit time multiplied by an integer equal to or greater than '0'; an activation summing part that receives the macro response signal and the micro response signal to generate the modulation signal, wherein the activation width of the modulation signal corresponds to the sum of the activation width of the macro response signal and the activation width of the micro response signal; and a micro disable generating part that generates a micro disable signal activated according to the data value of the micro data, wherein the micro disable signal is activated in any of the 1-st to n-th subframe in which the micro response signal is not activated, wherein the micro modulation part is disabled according to the activation of the micro disable signal.

12. The method of claim 11, further comprising: classifying, by a bit classification part of the pulse width modulator, frame bits of the frame data into frame bit of the macro data and the frame bit of the micro data; and generating, by a sub-counting part of the pulse width modulator, sub-counting information, wherein the 1-st to n-th subframes in the unit frame are distinguished by the sub-counting information.

13. The method of claim 11, further comprising:

generating, by a sub-data generating unit of the macro modulation part, 1-st to n-th sub-data corresponding to the 1-st to n-th subframes, wherein the data values of the 1-st to n-th sub-data depends on the data value of the macro data;

generating, by a gray clock generating unit of the macro modulation part, a gray clock signal, wherein a period of the gray clock signal corresponds to the macro unit time; and generating, by a macro modulation unit of the macro modulation part, the macro response signal by modulating the 1-st to n-th sub-data with using the gray clock signal, wherein the activation widths of the macro response signal in the 1-st to n-th subframes correspond to the data values of the 1-st to n-th sub-data.

14. The method of claim 11, wherein 'n' is a natural number greater than or equal to '4', the activation width of the macro response signal in i-th subframe depends on whether a integer value of a cumulative error of the i-th subframe is equal to the integer value of the cumulative error of (i−1)-th subframe, the cumulative error of the i-th subframe is (i*r+e)/n}, and 'i' is a natural number between '1' and 'n', 'r' is a remainder obtained by dividing the data value(G) of the macro data by the 'n', 'r' is an integer between '0' and '(n−1)', and 'e' is an arbitrary number.

15. The method of claim 14, wherein the integer value of the cumulative error of a 0-th subframe is '0'.

16. The method of claim 15, wherein the activation width of the macro response signal in the i-th subframe corresponds to a length of 'a' number of the macro unit time in case that the integer value of the cumulative error of the i-th subframe is equal to the integer value of the cumulative error of the (i−1)-th subframe, and 'a' is a quotient obtained by dividing the data value (G) of the macro data by 'n'.

17. The method of claim 16, wherein the activation width of the macro response signal in the i-th subframe corresponds to the length of 'a+1' number of the macro unit time in case that the integer value of the cumulative error of the i-th subframe is different from the integer value of the cumulative error of the (i−1)-th subframe.

18. The method of claim 14, wherein the micro response signal is activated with an activation width corresponding to the micro data in any one of the 1-st to n-th subframe.

19. The method of claim 18, wherein the micro response signal is activated in the 1-st subframe.

20. The method of claim 14, wherein 'e' is '0'.

* * * * *